US010473183B2

(12) United States Patent
Takikawa et al.

(10) Patent No.: US 10,473,183 B2
(45) Date of Patent: Nov. 12, 2019

(54) DAMPER DEVICE AND STARTING DEVICE

(71) Applicant: AISIN AW CO., LTD., Anjo-shi, Aichi-ken (JP)

(72) Inventors: Yoshihiro Takikawa, Tsuchima (JP); Makoto Ueno, Anjo (JP); Masaki Wajima, Anjo (JP); Koichiro Ida, Nishio (JP); Kazuhiro Itou, Anjo (JP); Yuji Kanyama, Sabae (JP); Aki Ogawa, Sabae (JP); Kotaro Tsuda, Fukui (JP)

(73) Assignee: AISIN AW CO., LTD., Anjo-shi, Aichi-ken (JP)

( * ) Notice: Subject to any disclaimer, the term of this patent is extended or adjusted under 35 U.S.C. 154(b) by 374 days.

(21) Appl. No.: 14/917,040

(22) PCT Filed: Sep. 19, 2014

(86) PCT No.: PCT/JP2014/074902
§ 371 (c)(1),
(2) Date: Mar. 7, 2016

(87) PCT Pub. No.: WO2015/046076
PCT Pub. Date: Apr. 2, 2015

(65) Prior Publication Data
US 2016/0195157 A1     Jul. 7, 2016

(30) Foreign Application Priority Data

Sep. 30, 2013   (JP) ................................. 2013-203458

(51) Int. Cl.
*F16F 15/123*     (2006.01)
*F16F 15/14*     (2006.01)
(Continued)

(52) U.S. Cl.
CPC .......... *F16F 15/12353* (2013.01); *F16D 3/12* (2013.01); *F16F 15/12366* (2013.01);
(Continued)

(58) Field of Classification Search
CPC ............. F16F 15/12353; F16F 15/1428; F16F 15/1457; F16H 45/02; F16H 2045/0226; F16D 3/12
(Continued)

(56) References Cited

U.S. PATENT DOCUMENTS 5,713,442 A * 2/1998 Murata ................... F16F 1/041
                                                              192/213.2
6,056,102 A    5/2000 Ohkubo et al.
(Continued)

FOREIGN PATENT DOCUMENTS

DE          10358901 A1    2/2005
DE    102008056636 A1    7/2009
(Continued)

OTHER PUBLICATIONS

International Search Report for PCT/JP2014/074902 dated Dec. 22, 2014.

*Primary Examiner* — Nathaniel E Wiehe
*Assistant Examiner* — Richard C Drake
(74) *Attorney, Agent, or Firm* — Sughrue Mion, PLLC

(57) ABSTRACT

A damper device of a starting device includes a drive member, a driven member, outer springs that transmit torque between the drive member and the driven member, first and second inner springs that are placed inward of the outer springs and that transmit torque between the drive member and the driven member, and a dynamic damper having third springs coupled to a first intermediate member as a rotary element and a turbine runner as a mass body coupled to the third springs. The third springs of the dynamic damper are
(Continued)

disposed so as to be located next to the outer springs of the damper device in the circumferential direction.

32 Claims, 7 Drawing Sheets

(51) Int. Cl.
*F16H 45/02* (2006.01)
*F16D 3/12* (2006.01)
(52) U.S. Cl.
CPC ...... *F16F 15/1428* (2013.01); *F16F 15/1457* (2013.01); *F16H 45/02* (2013.01); *F16F 15/12373* (2013.01); *F16H 2045/021* (2013.01); *F16H 2045/0205* (2013.01); *F16H 2045/0226* (2013.01); *F16H 2045/0263* (2013.01); *F16H 2045/0284* (2013.01); *F16H 2045/0294* (2013.01)
(58) Field of Classification Search
USPC .......................................................... 60/338
See application file for complete search history.

(56) References Cited

U.S. PATENT DOCUMENTS

| | | | |
|---|---|---|---|
| 6,079,531 A | 6/2000 | Ohkubo et al. | |
| 6,257,383 B1 | 7/2001 | Ohkubo et al. | |
| 8,932,142 B2* | 1/2015 | Takikawa | F16D 3/66 464/64.1 |
| 9,297,448 B1* | 3/2016 | Depraete | F16H 45/02 |
| 9,599,206 B2* | 3/2017 | Depraete | F16H 45/02 |
| 2004/0226794 A1 | 11/2004 | Sasse et al. | |
| 2009/0125202 A1 | 5/2009 | Swank et al. | |
| 2009/0272108 A1* | 11/2009 | Degler | F16F 15/12353 60/338 |
| 2011/0192692 A1 | 8/2011 | Werner et al. | |
| 2011/0240432 A1* | 10/2011 | Takikawa | F16H 45/02 192/3.29 |
| 2012/0080280 A1 | 4/2012 | Takikawa et al. | |
| 2012/0080282 A1* | 4/2012 | Takikawa | F16H 45/02 192/3.28 |
| 2012/0208648 A1* | 8/2012 | Takikawa | F16H 45/02 464/68.8 |
| 2012/0252587 A1* | 10/2012 | Takikawa | F16H 45/02 464/68.8 |
| 2013/0230385 A1* | 9/2013 | Lindemann | F16D 33/18 415/122.1 |
| 2013/0305876 A1* | 11/2013 | Schnaedelbach | F16F 15/145 74/574.2 |
| 2014/0291098 A1* | 10/2014 | Saiga | F16D 3/12 192/3.28 |
| 2015/0005078 A1* | 1/2015 | Sekiguchi | F16H 45/02 464/24 |
| 2015/0345565 A1* | 12/2015 | Tomiyama | F16D 3/12 464/68.8 |
| 2017/0175849 A1* | 6/2017 | Ito | F16F 15/12353 |
| 2017/0328444 A1* | 11/2017 | Hagihara | F16F 15/1414 |

FOREIGN PATENT DOCUMENTS

| | | |
|---|---|---|
| DE | 102009042837 A1 | 4/2010 |
| DE | 112011100632 B4 | 2/2017 |
| JP | H10-159938 A | 6/1998 |
| JP | H10-246307 A | 9/1998 |
| JP | 2003-21219 A | 1/2003 |
| JP | 2004-239365 A | 8/2004 |
| JP | 2009-115112 A | 5/2009 |
| JP | 2011-214607 A | 10/2011 |
| JP | 2012-77784 A | 4/2012 |
| JP | 2012-077823 A | 4/2012 |
| JP | 2012-202543 A | 10/2012 |
| WO | 2011/076168 A1 | 6/2011 |

* cited by examiner

DAMPER DEVICE AND STARTING DEVICE

TECHNICAL FIELD

The present disclosure relates to damper devices including an input element, an output element, an outer elastic body that transmits torque between the input element and the output element, and an inner elastic body that is placed inward of the outer elastic body and that transmits torque between the input element and the output element, and starting devices including the damper device.

BACKGROUND ART

Conventionally, a damper device including a dynamic damper having a third elastic body that is coupled to any one of rotary elements forming the damper device and a mass body that is coupled to the third elastic body is known as this type of damper device (see, e.g., Patent Document 1). In this damper device, the third elastic body of the dynamic damper is disposed radially outward or inward of first and second elastic bodies that transmit torque between the input element and the output element, or is disposed between the first elastic body and the second elastic body in the radial direction.

RELATED ART DOCUMENTS

Patent Documents

[Patent Document 1] International Publication WO 2011/076168

SUMMARY

However, in the case where the third elastic body of the dynamic damper is disposed at a different radial position from the first and second elastic bodies that transmit torque between the input element and the output element as in the conventional damper device, the outside diameter of the damper device is increased, making it difficult to make the entire device compact.

It is a primary object of the present disclosure to suppress an increase in outside diameter of a damper device including a dynamic damper and thus make the entire device compact.

A damper device according to the present disclosure is a damper device including an input element, an output element, an outer elastic body that transmits torque between the input element and the output element, and an inner elastic body that is disposed inward of the outer elastic body and that transmits torque between the input element and the output element, and includes: a dynamic damper that has a third elastic body coupled to any one of rotary elements forming the damper device and a mass body coupled to the third elastic body, and that applies vibration of an opposite phase to the rotary element to dampen vibration, wherein the third elastic body is disposed so as to be located next to the outer elastic body in a circumferential direction.

This damper device includes the dynamic damper that has the third elastic body coupled to any one of the rotary elements and the mass body coupled to the third elastic body, and that applies vibration of the opposite phase to the rotary element to dampen vibration. The third elastic body of the dynamic damper is disposed so as to be located next to the outer elastic body in the circumferential direction, and overlaps the outer elastic body in both axial and radial directions of the damper device. This can suppress an increase in outside diameter of the damper device and can make the entire device compact as compared to the case where the third elastic body of the dynamic damper is disposed radially outward or inward of the outer elastic body and the inner elastic body or between the outer elastic body and the inner elastic body in the radial direction. Moreover, since the third elastic body of the dynamic damper is disposed near an outer periphery of the damper device so as to be located next to the outer elastic body in the circumferential direction, this can suppress an excessive increase in rigidity of the outer elastic body and the third elastic body and reduce rigidity of the inner elastic body, and can thus further improve damping performance of the damper device including the dynamic damper.

A distance between an axis of the damper device and an axis of the outer elastic body may be equal to a distance between the axis of the damper device and an axis of the third elastic body. This can more satisfactorily suppress an increase in outside diameter of the damper device.

The axis of the outer elastic body and the axis of the third elastic body may be included in a same plane orthogonal to the axis of the damper device. This can also suppress an increase in axial length of the damper device, and can therefore make the entire device more compact.

The damper device may further include: an intermediate element that transmits power from the outer elastic body to the inner elastic body, and the input element may have an input-side contact portion that contacts the outer elastic body, and the third elastic body may be coupled to the intermediate element.

The inner elastic body may include a first inner elastic body and a second inner elastic body that are disposed so as to adjoin each other. The damper device may further include: a first intermediate element that transmits power from the outer elastic body to the first inner elastic body; and a second intermediate element that transmits power from the first inner elastic body to the second inner elastic body. The third elastic body may be coupled to the first intermediate element.

The damper device may further include: an intermediate element that transmits power from the outer elastic body to the inner elastic body. The intermediate element may have a plurality of intermediate-side contact portions that can contact the outer elastic body and the third elastic body. The outer elastic body may be supported from both sides by two of the intermediate-side contact portions in a mounted state of the damper device. Both ends of the third elastic body may respectively contact the intermediate-side contact portions in the mounted state of the damper device.

The input element may have a plurality of input-side contact portions that contact the outer elastic body, and the outer elastic body may be supported from both sides by two of the input-side contact portions in the mounted state of the damper device.

The damper device may further include: an intermediate element that transmits power from the outer elastic body to the inner elastic body. The input element may have an input-side contact portion that contacts the outer elastic body. The intermediate element may have an intermediate-side contact portion that can contact the outer elastic body and the third elastic body. A coupling member having a plurality of elastic body contact portions provided so as to contact both ends of the third elastic body may be fixed to the mass body of the dynamic damper. At least one of a distance between the axis of the damper device and the input-side contact portion, a distance between the axis of the damper device and the intermediate-side contact portion, and a distance between the axis of the damper device and the elastic body contact portion is different from the remaining two distances. The input-side contact portion, the intermediate-side contact portion, and the elastic body contact portions of the coupling member are thus disposed at different distances from the axis of the damper device, whereby strokes of the outer elastic body and the third elastic body can be satisfactorily ensured.

The input-side contact portion of the input element may be located next to the intermediate-side contact portion of the intermediate element in a radial direction of the damper device, and the intermediate-side contact portion of the intermediate element may be located next to the elastic body contact portion of the coupling member in the radial direction of the damper device.

The distance between the axis of the damper device and the elastic body contact portion may be larger than the distance between the axis of the damper device and the intermediate-side contact portion.

The distance between the axis of the damper device and the input-side contact portion, the distance between the axis of the damper device and the intermediate-side contact portion, and the distance between the axis of the damper device and the elastic body contact portion may be different from each other.

The intermediate element may include a first plate member having an annular guide portion that guides the outer elastic body, and a second plate member having the intermediate-side contact portion and coupled to the first plate member. The input-side contact portion of the input element may protrude inside the annular guide portion through an opening formed in the first plate member, and may contact the outer elastic body at a position radially inward of the intermediate-side contact portion of the second plate member. The elastic body contact portion of the coupling member may contact the end of the third elastic body at a position radially outward of the intermediate-side contact portion. The input-side contact portion of the input element, the intermediate-side contact portion of the intermediate element, and the elastic body contact portions of the coupling member are thus placed from the inside toward the outside in this order. The input element, the intermediate element, and the coupling member therefore do not interfere with each other when rotating, and the strokes of the outer elastic body and the third elastic body can be more satisfactorily ensured.

The input element may include a first input member having an elastic body surrounding portion that surrounds and guides the outer elastic body, and a second input member having the input-side contact portion and coupled to the first input member. The elastic body contact portion of the coupling member may protrude inside the elastic body surrounding portion through an opening formed in the first input member, and may contact the end of the third elastic body at a position radially inward of the input-side contact portion of the second input member. The intermediate element may be disposed between the first input member and the second input member such that the intermediate-side contact portion can contact the outer elastic body and the third elastic body at a position radially inward of the elastic body contact portion of the coupling member. The intermediate-side contact portion of the intermediate element, the elastic body contact portions of the coupling member, and the input-side contact portion of the input element are thus placed from the inside toward the outside in this order. The input element, the intermediate element, and the coupling member therefore do not interfere with each other when rotating, and the strokes of the outer elastic body and the third elastic body can be more satisfactorily ensured.

The outer elastic body may be an arc coil spring, and the inner elastic body may be a linear coil spring.

The third elastic body may be a linear coil spring.

The damper device and the dynamic damper may satisfy $0.90 \times f \leq fdd \leq 1.10 \times f$, where "f" represents a resonance frequency of the damper device, and "fdd" represents a resonance frequency of the dynamic damper.

The damper device may further include: a centrifugal pendulum vibration absorbing device coupled to any one of the rotary elements included in the damper device.

The damper device and the dynamic damper may satisfy $1.0 \leq Los/Lds \leq 10.0$, where "Los" represents a circumferential length of the outer elastic body in the mounted state of the damper device, and "Lds" represents a circumferential length of the third elastic body in the mounted state of the damper device.

A starting device according to the present disclosure is a starting device including any of the above damper devices, a pump impeller, and a turbine runner that together with the pump impeller forms a hydraulic transmission device, and wherein the dynamic damper has a coupling member that has a plurality of elastic body contact portions provided so as to contact both ends of the third elastic body, and that is fixed to the turbine runner, and the mass body of the dynamic damper is formed at least by the turbine runner and the coupling member. Since the turbine runner is used also as the mass body of the dynamic damper, a more compact starting device including a damper device can be achieved.

Another starting device according to the present disclosure is a starting device including any of the above damper devices, a pump impeller, and a turbine runner that together with the pump impeller forms a hydraulic transmission device, and wherein the dynamic damper has a dedicated mass body that is different form the turbine runner. The dynamic damper thus may have a dedicated mass body as in this starting device.

Modes for carrying out the present disclosure will be described below with reference to the accompanying drawings.

Figure 1:
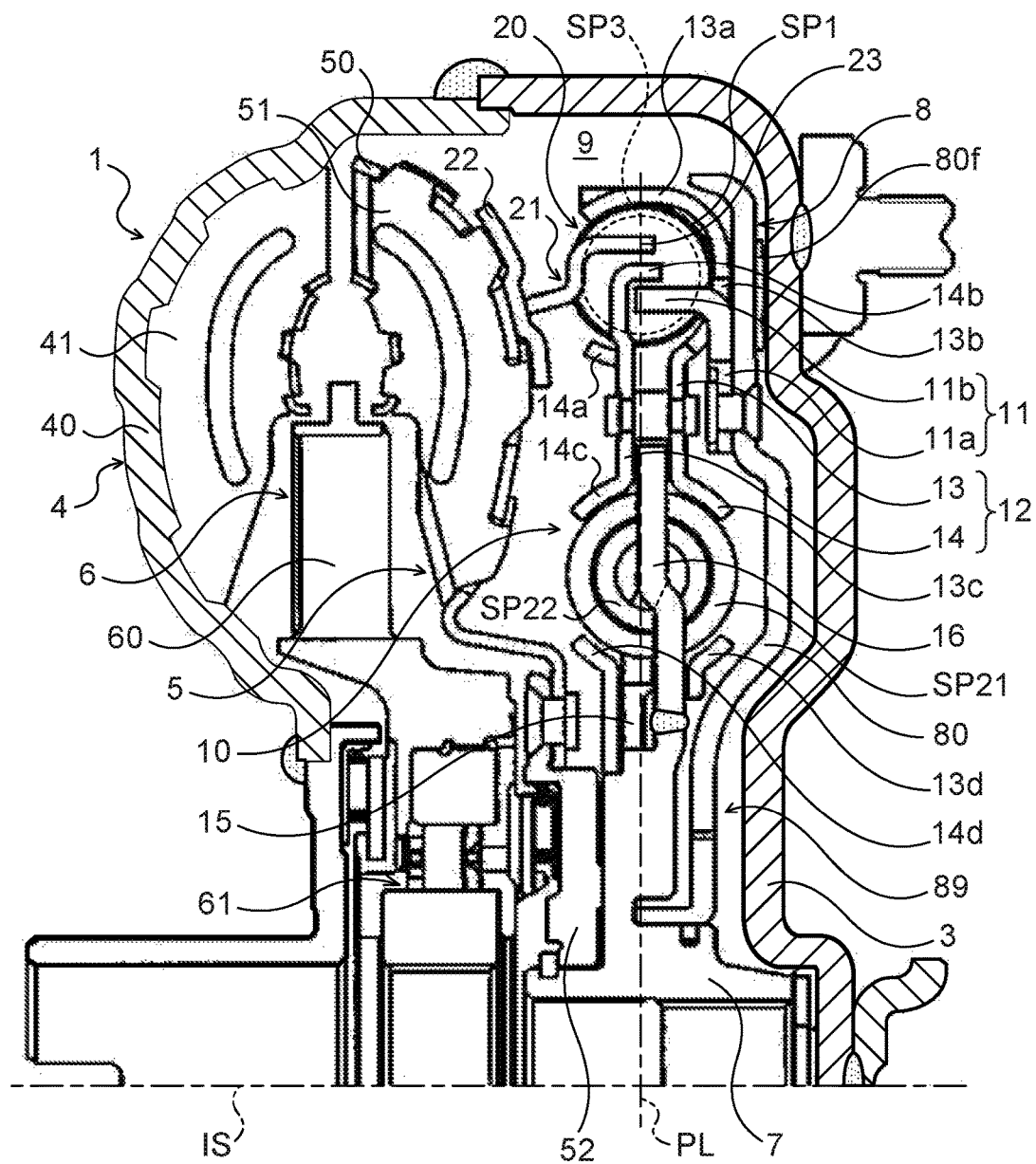
FIG. 1 is a partial sectional view showing a starting device including a damper device according to an embodiment.

FIG. 1 is a partial sectional view showing a starting device 1 including a damper device 10 according to an embodiment of the present disclosure. The starting device 1 shown in the figure is a device that is mounted on a vehicle including an engine (internal combustion engine) as a motor. The starting device 1 includes, in addition to the damper device 10, a front cover 3 as an input member that is coupled to a crankshaft of the engine, a pump impeller (input-side hydraulic transmission element) 4 that is fixed to the front cover 3, a turbine runner (output-side hydraulic transmission element) 5 that is rotatable coaxially with the pump impeller 4, a damper hub 7 as an output member that is coupled to the damper device 10 and that is fixed to an input shaft IS of a transmission as an automatic transmission (AT) or a continuously variable transmission (CVT), a lockup clutch 8 as a single-plate hydraulic clutch, a dynamic damper 20 that is coupled to the damper device 10, etc.

The pump impeller 4 has a pump shell 40 tightly fixed to the front cover 3, and a plurality of pump blades 41 disposed on the inner surface of the pump shell 40. The turbine runner 5 has a turbine shell 50 and a plurality of turbine blades 51 disposed on the inner surface of the turbine shell 50. The inner periphery of the turbine shell 50 is fixed to a turbine hub 52 via a plurality of rivets. The turbine hub 52 is rotatably supported by the damper hub 7, and movement of the turbine hub 52 in the axial direction of the starting device 1 is restricted by the damper hub 7 and a snap ring mounted on the damper hub 7.

The pump impeller 4 and the turbine runner 5 face each other, and a stator 6 that adjusts the flow of hydraulic oil (working fluid) from the turbine runner 5 to the pump impeller 4 is coaxially placed between the pump impeller 4 and the turbine runner 5. The stator 6 has a plurality of stator blades 60, and the rotational direction of the stator 6 is set to only one direction by a one-way clutch 61. The pump impeller 4, the turbine runner 5, and the stator 6 form a torus (annular flow path) in which hydraulic oil is circulated, and function as a torque converter (hydraulic transmission device) having a function to amplify torque. In the starting device 1, the stator 6 and the one-way clutch 61 may be omitted, and the pump impeller 4 and the turbine runner 5 may function as a fluid coupling.

The lockup clutch 8 performs a lockup operation of coupling the front cover 3 to the turbine hub 7 via the damper device 10 and cancels the lockup. The lockup clutch 8 has a lockup piston 80 that is placed in the front cover 3 at a position near the inner wall surface on the engine side (the right side in the figure) of the front cover 3 and that is fitted on the damper hub 7 so as to be slidable in the axial direction and rotatable. As shown in FIG. 1, a friction material 80f is adhesively attached to an outer peripheral part of the surface of the lockup piston 80 which faces the front cover 3. A lockup chamber 89 that is connected to a hydraulic control device, not shown, via a hydraulic oil supply hole and an oil passage formed in the input shaft IS is defined between the lockup piston 80 and the front cover 3.

Hydraulic oil that is supplied from the hydraulic control device to the pump impeller 4 and the turbine runner 5 (torus) can flow into the lockup chamber 89. Accordingly, if the pressure in a hydraulic transmission chamber 9 defined by the front cover 3 and the pump shell 40 of the pump impeller 4 and the pressure in the lockup chamber 89 are kept equal to each other, the lockup piston 80 does not move toward the front cover 3, and the lockup piston 80 does not frictionally engage with the front cover 3. On the other hand, if the pressure in the lockup chamber 89 is reduced by the hydraulic control device, not shown, the lockup piston 80 moves toward the front cover 3 due to the pressure difference and frictionally engages with the front cover 3. The front cover 3 is thus coupled to the damper hub 7 via the damper device 10.

Figure 2:
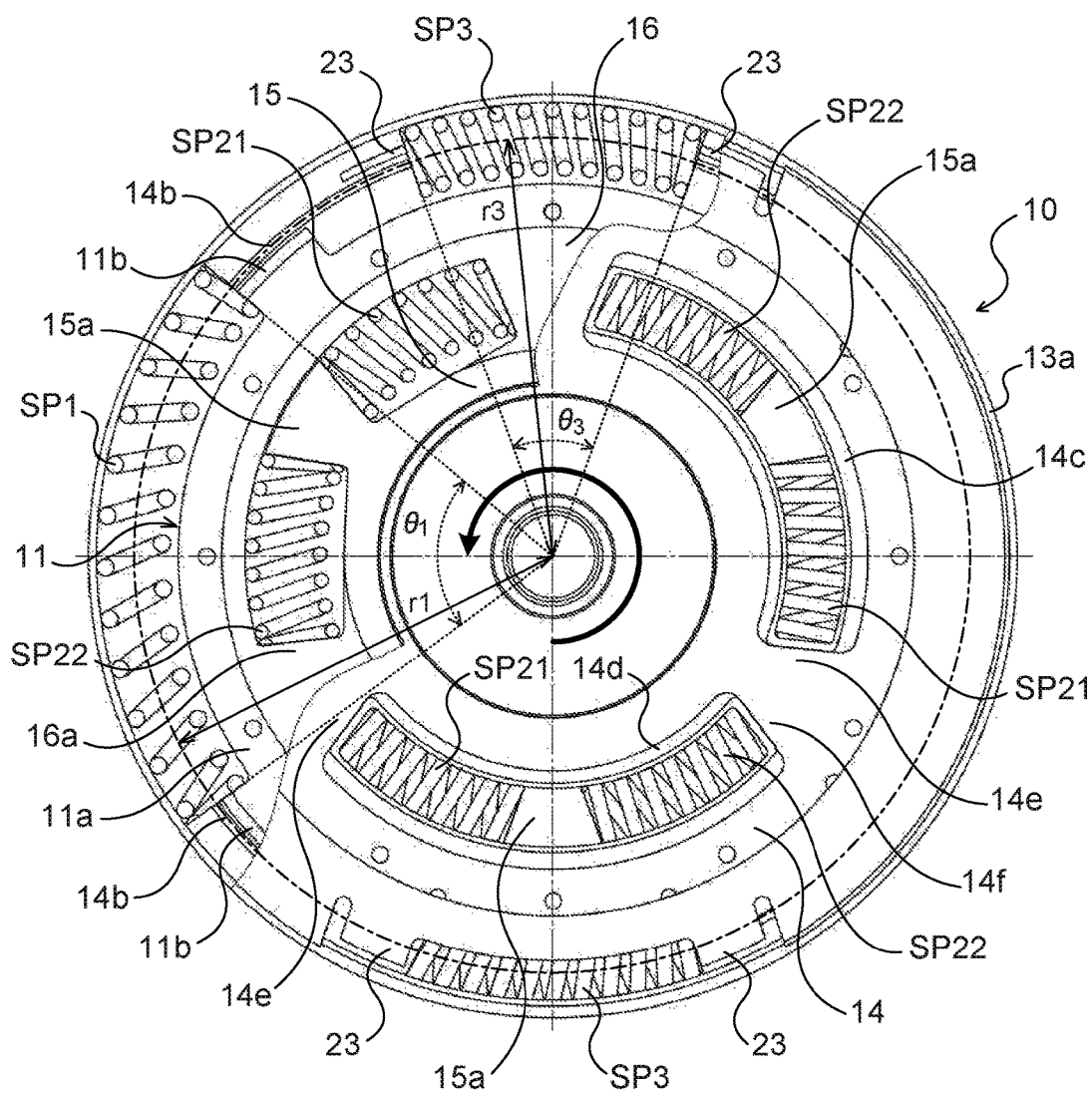
FIG. 2 is a plan view of the damper device shown in FIG. 1.

As shown in FIGS. 1 and 2, the damper device 10 includes as rotary elements a drive member (input element) 11, a first intermediate member 12 and a second intermediate member 15 as an intermediate element, and a driven member (output element) 16, and includes as power transmission elements a plurality of (in the present embodiment, two) outer springs (outer elastic bodies) SP1 that are disposed near the outer periphery of the damper device 10, and a plurality of (in the present embodiment, three) first inner springs (inner elastic bodies) SP21 and a plurality of (in the present embodiment, three) second inner springs (inner elastic bodies) SP22 that are placed inward of the outer springs SP1.

In the present embodiment, the outer springs SP1 are arc springs (arc coil springs) each made of a metal material wound so as to have an axis extending in an arc shape when not subjected to a load. This can further reduce rigidity (reduce the spring constant) of the outer springs SP1 and can further reduce rigidity (increase the stroke) of the damper device 10. In the present embodiment, the first and second inner springs SP21, SP22 are coil springs (linear coil springs) each made of a metal material wound in a helical shape so as to have an axis extending straight when not subjected to a load. The first and second inner springs SP21, SP22 have higher rigidity (spring constant) than the outer springs SP1. The rigidity (spring constant) of the first inner springs SP21 may be either the same as or different from that of the second inner springs SP22. Arc springs may be used as the first and second inner springs SP21, SP22.

The drive member 11 has an annular fixed portion 11a that is fixed to the lockup piston 80 of the lockup clutch 8 via a plurality of rivets, and a plurality of spring contact portions (input-side contact portions) 11b extended in the axial direction from the outer periphery of the fixed portion 11a toward the pump impeller 4 and the turbine runner 5. The drive member 11 is fixed to the lockup piston 80 so as to be placed in an outer peripheral region in the hydraulic transmission chamber 9. The first intermediate member 12 includes an annular first plate member 13 that is placed on the front cover 3 (the lockup piston 80) side, and an annular second plate member 14 that is placed on the pump impeller 4 side or on the turbine runner 5 side and that is coupled (fixed) to the first plate member 13 via a rivet.

As shown in FIG. 1, the first plate member 13 of the first intermediate member 12 has an annular guide portion (annular support portion) 13a that guides the plurality of outer springs SP1, a plurality of openings 13b formed at intervals near the annular guide portion 13a, a plurality of spring guide portions (spring support portions) 13c formed at positions closer to the inner periphery of the first plate member 13 than the openings 13b, and a plurality of spring guide portions (spring support portions) 13d formed at positions closer to the inner periphery of the first plate member 13 than the plurality of spring guide portions 13c. The first plate member 13 further has spring contact portions 13e (see FIG. 4) each contacting an end (end on the upstream side in a normal rotation direction) of the first inner spring SP21 located on the upstream side in the normal rotation direction (the rotation direction of the engine, see a thick arrow in FIG. 2) of the drive member 11 etc. out of those first and second inner springs SP21, SP22 adjoining each other, and spring contact portions, not shown, each contacting an end (end on the downstream side in the normal rotation direction) of the second inner spring SP22 located on the downstream side in the normal rotation direction of the drive member 11 etc. out of those first and second inner springs SP21, SP22 adjoining each other.

The annular guide portion 13a of the first plate member 13 is formed so as to surround one side (the right side in FIG. 1) of each outer spring SP1 and the outer periphery of each outer spring SP1 from the front cover 3 side. Each spring contact portion 11b of the drive member 11 protrudes inside the annular guide portion 13a through a corresponding one of the openings 13b and contacts an end (end on the upstream side in the normal rotation direction of the drive member 11 etc., see FIG. 2) of a corresponding one of the outer springs SP1. That is, in the mounted state of the damper device 10, each outer spring SP1 is supported from both sides by two of the spring contact portions 11b, as shown in FIG. 2. Moreover, the spring guide portions 13c face the spring guide portions 13d in the radial direction of the first plate member 13, and the spring guide portions 13c, 13d guide the sides (the right sides in FIG. 1) of the first and second inner spring SP21, SP22.

The second plate member 14 that is coupled (fixed) to the first plate member 13 has a plurality of spring guide portions (spring support portions) 14a formed inward of the annular guide portion 13a of the first plate member 13 and each guiding a corresponding one of the outer springs SP1, a plurality of (in the present embodiment, four) spring contact portions (intermediate-side contact portions) 14b formed outward of the spring guide portions 14a and extended in the axial direction toward the front cover 3, a plurality of spring guide portions (spring support portions) 14c formed so as to face the spring guide portions 13c of the first plate member 13, and a plurality of spring guide portions (spring support portions) 14d formed so as to face the spring guide portions 13d of the first plate member 13. As shown in FIG. 2, the second plate member 14 further has spring contact portions 14e each contacting an end (end on the upstream side in the normal rotation direction) of the first inner spring SP21 located on the upstream side in the normal rotation direction of the drive member 11 etc. out of those first and second inner springs SP21, SP22 adjoining each other, and spring contact portions 14f each contacting an end (end on the downstream side in the normal rotation direction) of the second inner spring SP22 located on the downstream side in the normal rotation direction of the drive member 11 etc. out of those first and second inner springs SP21, SP22 adjoining each other.

As shown in FIG. 1, the plurality of outer springs SP1 that are guided by the annular guide portion 13a of the first plate member 13 and the spring guide portions 14a of the second plate member 14 are placed in the outer peripheral region in the hydraulic transmission chamber 9. As shown in FIGS. 1 and 2, in the mounted state of the damper device 10, each spring contact portion 14b of the second plate member 14 contacts an end of the outer spring SP1 at a position radially outward of the spring contact portion 11b of the drive member 11. That is, in the mounted state of the damper device 10, each outer spring SP1 is supported from both sides by two of the spring contact portions 14b, as shown in FIG. 2. The drive member 11 can thus be coupled to the first and second plate members 13, 14, namely the first intermediate member 12, via the plurality of outer springs SP1. Moreover, the spring guide portions 14c face the spring guide portions 14d in the radial direction of the second plate member 14, and the spring guide portions 14c, 14d support the sides (the left sides in FIG. 1) of the first and second inner springs SP21, SP22. The first and second inner springs SP21, SP22 that are guided by the spring guide portions 13c, 13d of the first plate member 13 and the spring guide portions 14c, 14d of the second plate member 14 are thus disposed inward of the plurality of outer springs SP1 so as to be located close to the input shaft IS.

As shown in FIG. 1, the second intermediate member 15 is disposed between the first plate member 13 and the second plate member 14 and is rotatably supported by the damper hub 7. As shown in FIG. 2, the second intermediate member 15 has a plurality of spring contact portions 15a formed at intervals in the circumferential direction so as to protrude radially outward and each disposed between those first and second inner springs SP21, SP22 adjoining each other. Each spring contact portion 15a contacts an end (end on the downstream side in the normal rotation direction) of the first inner spring SP21 located on the upstream side in the normal rotation direction of the drive member 11 etc., and contacts an end (end on the upstream side in the normal rotation direction) of the second inner spring SP22 located on the downstream side in the normal rotation direction of the drive member 11 etc.

The driven member 16 is disposed between the first plate member 13 and the second plate member 14 of the first intermediate member 12 and is fixed to the damper hub 7 by welding etc. As shown in FIG. 2, the driven member 16 has a plurality of spring contact portions 16a each contacting an end (end on the downstream side in the normal rotation direction) of a corresponding one of the second inner springs SP22. The driven member 16 is thus coupled to the first intermediate member 12 via the plurality of first inner springs SP21, the second intermediate member 15, and the plurality of second inner springs SP22.

The dynamic damper 20 includes a plurality of (in the present embodiment, two coil springs) third springs (third elastic bodies) SP3 as coil springs (linear coil springs) or arc springs (arc coil springs), and a coupling member 21 that is coupled to the third springs SP3 and that together with the turbine runner 5 and the turbine hub 52 forms a mass body. As used herein, the term "dynamic damper" refers to a mechanism that applies vibration of an opposite phase to a vibrating body at a frequency (engine speed) corresponding to the resonance frequency of the vibrating body to dampen vibration (vibration of the resonance frequency of the damper device 10), and the dynamic damper is formed by coupling the springs and the mass body such that the springs and the mass body are not included in a torque transmission path for the vibrating body. The dynamic damper can be operated at a desired frequency by adjusting the rigidity of the springs and the weight of the mass body.

The coupling member 21 of the dynamic damper 20 has an annular fixed portion 22 that is fixed to the turbine shell 50 of the turbine runner 5, and a plurality of (in the present embodiment, four) spring contact portions (elastic body contact portions) 23 extended from the fixed portion 22. The fixed portion 22 of the coupling member 21 is fixed to an outer peripheral region of the back surface (the surface on the front cover 3 side) of the turbine shell 50 by welding etc. The plurality of spring contact portions 23 are formed symmetrically with respect to the axis of the damper device 10 (the starting device 1) such that every two (a pair of) spring contact portions 23 are located close to each other. For example, two spring contact portions 23 that are paired with each other face each other at an interval according to the natural length of the third spring SP3. A single third spring SP3 is disposed between two spring contact portions 23 that are paired with each other. That is, in the mounted state of the damper device 10, each of the plurality of spring contact portions 23 contacts an end of a corresponding one of the third springs SP3, and each third spring SP3 is supported at its both ends by a corresponding pair of spring contact portions 23.

As shown in FIG. 2, each third spring SP3 is supported by a corresponding pair of spring contact portions 23. A single third spring SP3 is disposed between every adjoining two of the outer springs SP1 such that the third spring SP3 is located next to each of the adjoining two outer springs SP1 in the circumferential direction. The third springs SP3 overlap the outer springs SP1 both in the axial and radial directions of the starting device 1 or the damper device 10. The outer periphery of each third spring SP3 is guided by the annular guide portion 13a of the first plate member 13, and in the mounted state of the damper device 10, both ends of each third spring SP3 contact the spring contact portions 14b of the second plate member 14. Each third spring SP3 is thus coupled to the first intermediate member 12 as the intermediate element of the damper device 10. In the present embodiment, as shown in FIGS. 1 and 2, each of the plurality of spring contact portions 23 contacts the end of a corresponding one of the third springs SP3 at a position radially outward of the spring contact portion 14b of the second plate member 14. That is, the distance between the axis of the damper device 10 and the spring contact portion (elastic body contact portion) 23 is larger than that between the axis of the damper device 10 and the spring contact portion (intermediate-side contact portion) 14b.

As described above, the third springs SP3 of the dynamic damper 20 are disposed near the outer periphery of the damper device 10 so as to be located next to the outer springs SP1 in the circumferential direction. This can suppress an increase in outside diameter of the damper device 10 and can make the entire device more compact as compared to the case where the third springs SP3 are disposed radially outward or inward of the outer springs SP1 and the first and second inner springs SP21, SP22 or between the outer springs SP1 and the first and second inner springs SP21, SP22 in the radial direction. In the present embodiment, as shown in FIG. 2, the plurality of outer springs SP1 and the plurality of third springs SP3 are disposed on a concentric circle, so that the distance r1 between the axis of the starting device 1 or the damper device 10 and the axis of each outer spring SP1 is equal to the distance r3 between the axis of the starting device 1 or the damper device 10 and the axis of each third spring SP3. This can more satisfactorily suppress an increase in outside diameter of the damper device 10. Moreover, in the present embodiment, the outer springs SP1 and the third springs SP3 are disposed such that the axes of the outer springs SP1 and the axes of the third springs SP3 are included in the same plane PL (see FIG. 1) orthogonal to the axis of the starting device 1 or the damper device 10. This can also suppress an increase in axial length of the damper device 10.

The damper device 10 and the dynamic damper 20 are configured such that the ratio A of the circumferential length of the outer spring SP1 to the circumferential length of the third spring SP3, as given by A=Los/Lds, satisfies 1.0≤A≤10.0, more preferably 1.0≤A≤7.0, where "Los" represents the circumferential length of the outer spring SP1 in the mounted state of the damper device 10 (including the dynamic damper 20), "Lds" represents the circumferential length of the third spring SP3 in the mounted state of the damper device 10. Setting the ratio A to a value in this range regardless of the number of outer springs SP1 and the number of third springs SP3 can suppress an increase in outside diameter of the damper device 10, and can achieve proper rigidity of the outer springs 51 and the third springs SP3 and thus practically very satisfactorily improve damping performance of the damper device 10 including the dynamic damper 20.

The circumferential length of the outer spring SP1 and the circumferential length of the third spring SP3 in the mounted state of the damper device 10 refer to the length of the axis extending in an arc shape at least between a pair of spring contact portions in the case of arc springs, and refer to the length of the axis extending straight or in an arc shape at least between a pair of spring contact portions in the case of coil springs. The circumferential length of the outer spring SP1 and the circumferential length of the third spring SP3 in the mounted state of the damper device 10 can therefore be represented by the angle formed by the radius connecting one end of the axis of the outer spring SP1 or the third spring SP3 and the axis of the damper device 10 in the mounted state and the radius connecting the other end of the axis of the outer spring SP1 or the third spring SP3 and the axis of the damper device 10 in the mounted state, namely by the central angle. In the present embodiment, the central angle $\theta_1$ (see FIG. 2) representing the circumferential length of the outer spring SP1 in the mounted state of the damper device 10 is, e.g., 90°, and the central angle $\theta_3$ (see FIG. 2) representing the circumferential length of the third spring SP3 in the mounted state of the damper device 10 is, e.g., 30°. The ratio A is therefore A=3.0.

Operation of the starting device 1 configured as described above will be described below with reference to FIGS. 3 and 4.

Figure 3:
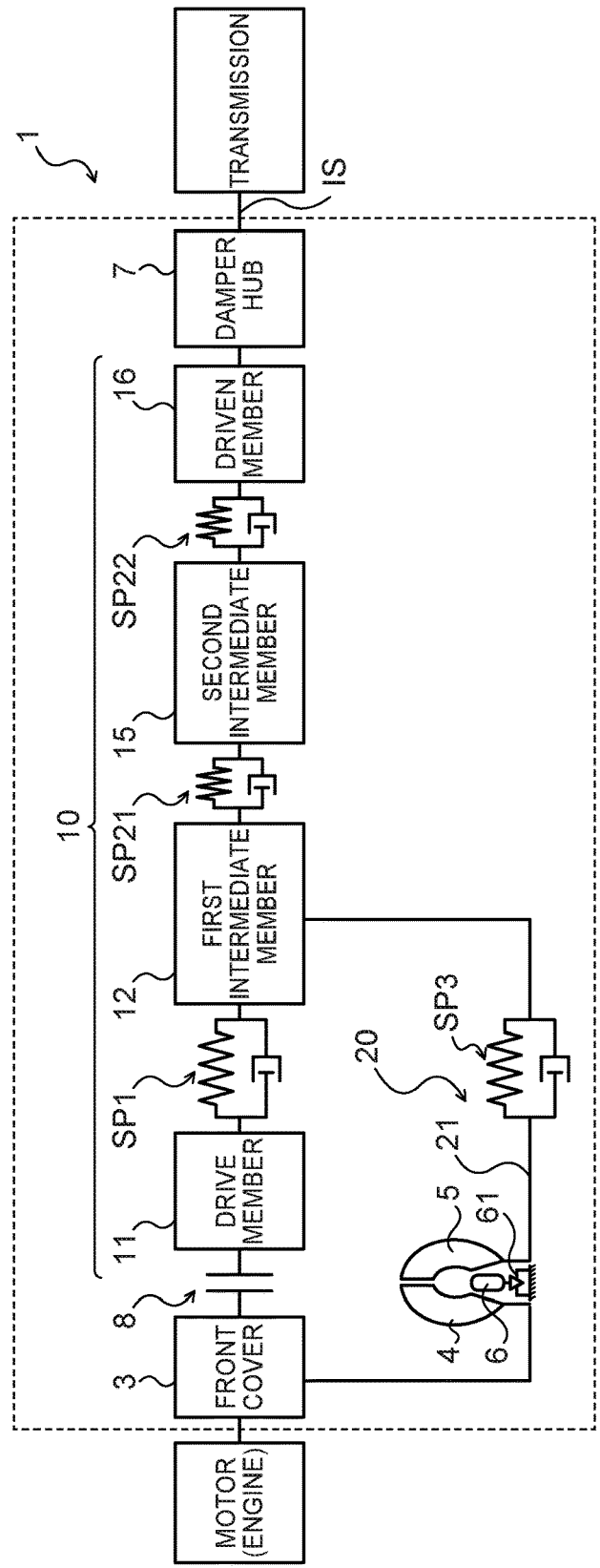
FIG. 3 is a schematic configuration diagram of the starting device shown in FIG. 1.
Figure 4:
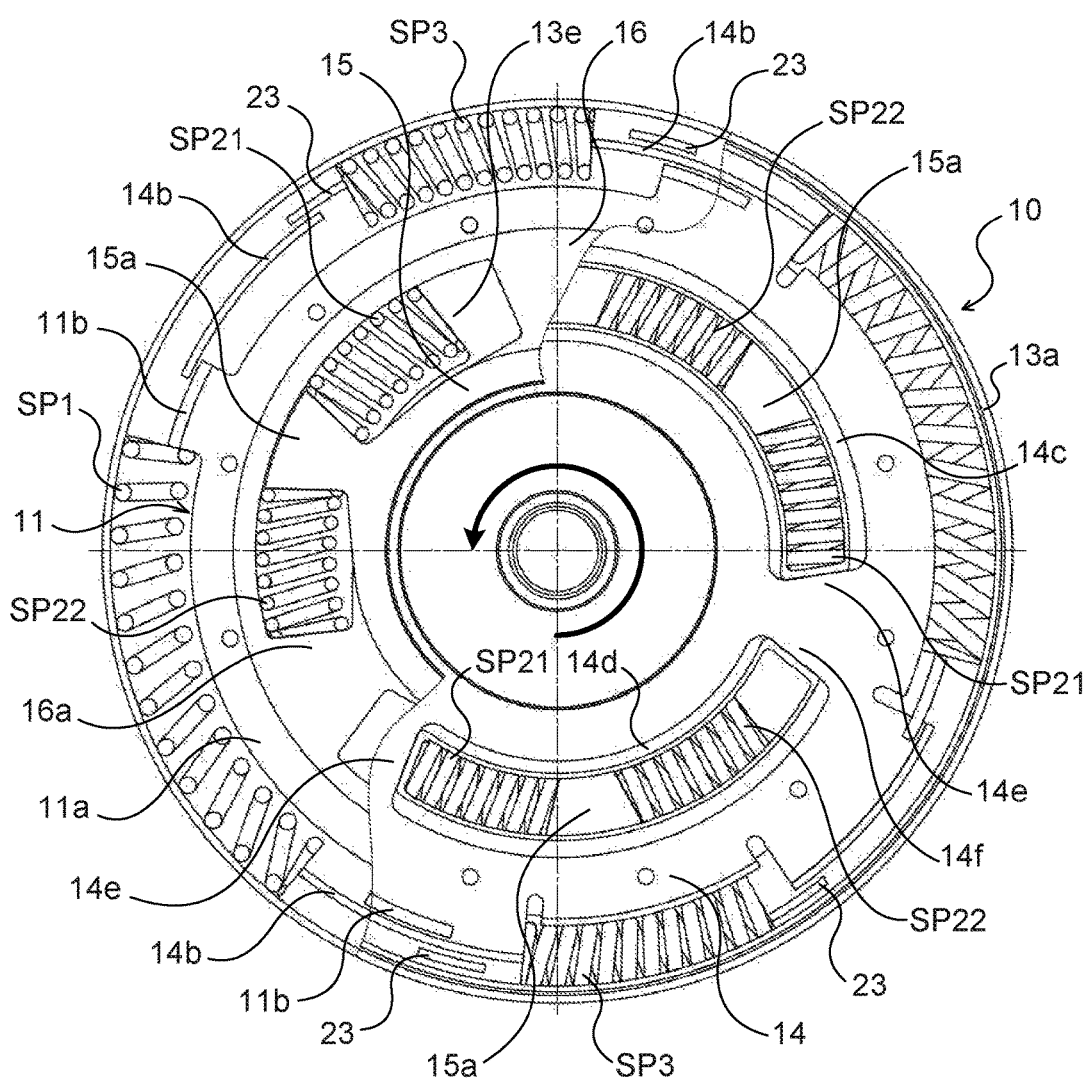
FIG. 4 is a plan view showing an operating state of the damper device shown in FIG. 1.

As can be seen from FIG. 3, in the state where the lockup is cancelled by the lockup clutch 8 of the starting device 1, torque (power) from the engine as a motor is transmitted to the input shaft IS of the transmission through a path formed by the front cover 3, the pump impeller 4, the turbine runner 5, the coupling member 21, the third springs SP3, the first intermediate member 12, the first inner springs SP21, the second intermediate member 15, the second inner springs SP22, the driven member 16, and the damper hub 7.

As can be seen from FIG. 3, when the lockup operation is being performed by the lockup clutch 8 of the starting device 1, torque (power) from the engine as a motor is transmitted to the input shaft IS of the transmission through a path formed by the front cover 3, the lockup clutch 8, the drive member 11, the outer springs SP1, the first intermediate member 12, the first inner springs SP21, the second intermediate member 15, the second inner springs SP22, the driven member 16, and the damper hub 7. At this time, fluctuations in torque that is applied to the front cover 3 are mainly dampened (absorbed) by the outer springs SP1 and the first and second inner springs SP21, SP22 of the damper device 10.

In the damper device 10, the third springs SP3 of the dynamic damper 20 are disposed near the outer periphery of the damper device 10 so as to be located next to the outer springs SP1 in the circumferential direction. This can suppress an excessive increase in rigidity (spring constant) of the outer springs SP1 and the third springs SP3 and reduce rigidity (spring constant) of the first and second inner springs SP21, SP22, and can thus further improve damping performance of the damper device 10 including the dynamic damper 20. In the starting device 1, fluctuations in torque that is applied to the front cover 3 can therefore be more satisfactorily dampened (absorbed) by the damper device 10 when the lockup operation is being performed by the lockup clutch 8.

When the lockup operation is being performed, the pump impeller 4 and the turbine runner 5 (the hydraulic transmission device) are not involved in transmission of torque between the front cover 3 and the input shaft IS of the transmission. As shown in FIG. 4, when the first intermediate member 12 is rotated by torque from the engine according to rotation of the engine, any (any two) of the spring contact portions 14b of the second plate member 14 presses one end of a corresponding one of the third springs SP3, and the other end of each third spring SP3 presses one of a corresponding pair of spring contact portions 23 of the coupling member 21. As a result, when the turbine runner 5 is not involved in transmission of power (torque), the dynamic damper 20 including the plurality of third springs SP3 and the turbine runner 5 etc. as the mass body is coupled to the first intermediate member 12 of the damper device 10. In the starting device 1, the dynamic damper 20 can thus apply vibration of the opposite phase to the first intermediate member 12 to satisfactorily dampen vibration. In the present embodiment, the specifications of the third springs SP3 etc. are set such that the resonance frequency fdd of the dynamic damper 20 is in the range of, e.g., ±10 (Hz) of the resonance frequency f of the damper device 10 (the frequency of resonance from the damper device 10 to a drive shaft) (so as to satisfy $0.90 \times f \leq fdd \leq 1.10 \times f$). The lockup operation can thus be performed when the engine speed reaches a lockup engine speed that is set to a very low value, e.g., about 1,000 rpm, whereby power transmission efficiency and fuel economy of the engine can be improved, and self-excited vibration can be suppressed.

As described above, the damper device 10 of the starting device 1 includes the dynamic damper 20 having the third springs SP3 that are coupled to the first intermediate member 12 as a rotary element and the mass body that is coupled to the third springs SP3. The third springs SP3 of the dynamic damper 20 are disposed near the outer periphery of the damper device 10 so as to be located next to the outer springs SP1 in the circumferential direction. This can suppress an increase in outside diameter of the damper device 10 and can make the entire device more compact as compared to the case where the third springs SP3 of the dynamic damper 20 are disposed radially outward or inward of the outer springs SP1 and the first and second inner springs SP21, SP22 or between the outer springs SP1 and the first and second inner springs SP21, SP22 in the radial direction. This can also suppress an excessive increase in rigidity (spring constant) of the outer springs SP1 and the third springs SP3 and reduce rigidity (spring constant) of the first and second inner springs SP21, SP22, and can thus further improve damping performance of the damper device including the dynamic damper 20.

Making the distance r1 between the axis of the damper device 10 and the axis of the outer spring SP1 equal to the distance r3 between the axis of the damper device 10 and the axis of the third spring SP3 as in the above embodiment can more satisfactorily suppress an increase in outside diameter of the damper device 10. Moreover, causing the axes of the outer springs SP1 and the axes of the third springs SP3 to be included in the same plane PL orthogonal to the axis of the damper device 10 can also suppress an increase in axial length of the damper device 10. Thus, it is possible to make the entire device more compact. The distance r1 between the axis of the damper device 10 and the axis of the outer spring SP1 need not necessarily be exactly the same as the distance r3 between the axis of the damper device 10 and the axis of the third spring SP3. The distances r1, r3 may be slightly different from each other due to design tolerance etc. Similarly, the axes of the outer springs SP1 and the axes of the third springs SP3 need not necessarily be completely included in the same plane. The axes of the outer springs SP1 and the axes of the third springs SP3 may be slightly shifted in the axial direction from the plane due to design tolerance etc.

Moreover, in the damper device 10, the spring contact portions (input-side contact portions) 11b of the drive member 11 protrude inside the annular guide portion 13a of the first plate member through the openings 13b formed in the first plate member 13 of the first intermediate member 12, and contact the outer springs SP1 at positions radially inward of the spring contact portions (intermediate-side contact portions) 14b of the second plate member 14. Each of the plurality of spring contact portions 23 of the coupling member 21 contacts the end of a corresponding one of the third springs SP3 at a position radially outward of the spring contact portions 14b of the first intermediate member 12. That is, in the above embodiment, the distance between the axis of the damper device 10 and the spring contact portion (input-side contact portion) 11b (e.g., the distance from the axis to the centerline in the thickness direction of the spring contact portion), the distance between the axis of the damper device 10 and the spring contact portion (intermediate-side contact portion) 14b, and the distance between the axis of the damper device 10 and the spring contact portion (elastic body contact portion) 23 are different from each other.

The spring contact portion 11b of the drive member 11, the spring contact portion 14b of the first intermediate member 12, and the spring contact portion 23 of the coupling member 21 are thus placed from the inside toward the outside in this order. The drive member 11, the first intermediate member 12, and the coupling member 21 therefore do not interfere with each other when rotating, and sufficiently long strokes of the outer springs SP1 and the third springs SP3 can be ensured. The spring contact portion 11b, the spring contact portion 14b, and the spring contact portion 23 need not necessarily be placed from the inside toward the outside in this order so as to be separated from each other in the radial direction. Depending on the strokes required for the outer springs SP1 and the third springs SP3, two of the spring contact portion 11b, the spring contact portion 14b, and the spring contact portion 23 may be placed radially outward or radially inward of the remaining one spring contact portion. That is, any one of the distance between the axis of the damper device 10 and the spring contact portion (input-side contact portion) 11b, the distance between the axis of the damper device 10 and the spring contact portion (intermediate-side contact portion) 14b, and the distance between the axis of the damper device 10 and the spring contact portion (elastic body contact portion) 23 may be different from the remaining two distances.

In the mounted state of the damper device 10, both ends of each third spring SP3 are supported by a corresponding pair of (two) spring contact portions 23 of the coupling member 21, and contact corresponding ones of the spring contact portions 14b of the second plate member 14. However, the present disclosure is not limited to this. The number of third springs SP3 of the dynamic damper 20 may be increased as appropriate, the coupling member 21 may have spring contact portions each contacting ends of adjoining two of the third springs SP3, and every two third springs SP3 adjoining each other with such a spring contact portion therebetween may be supported from both sides by a spring contact portion such as an intermediate member. This can eliminate backlash resulting from manufacturing tolerance, which tends to be caused in the case of supporting each third spring SP3 by at least a pair of spring contact portions. Namely, this can eliminate a gap between the end of the third spring SP3 and the spring contact portion. The dynamic damper 20 can therefore be made to operate more smoothly.

Figure 5:
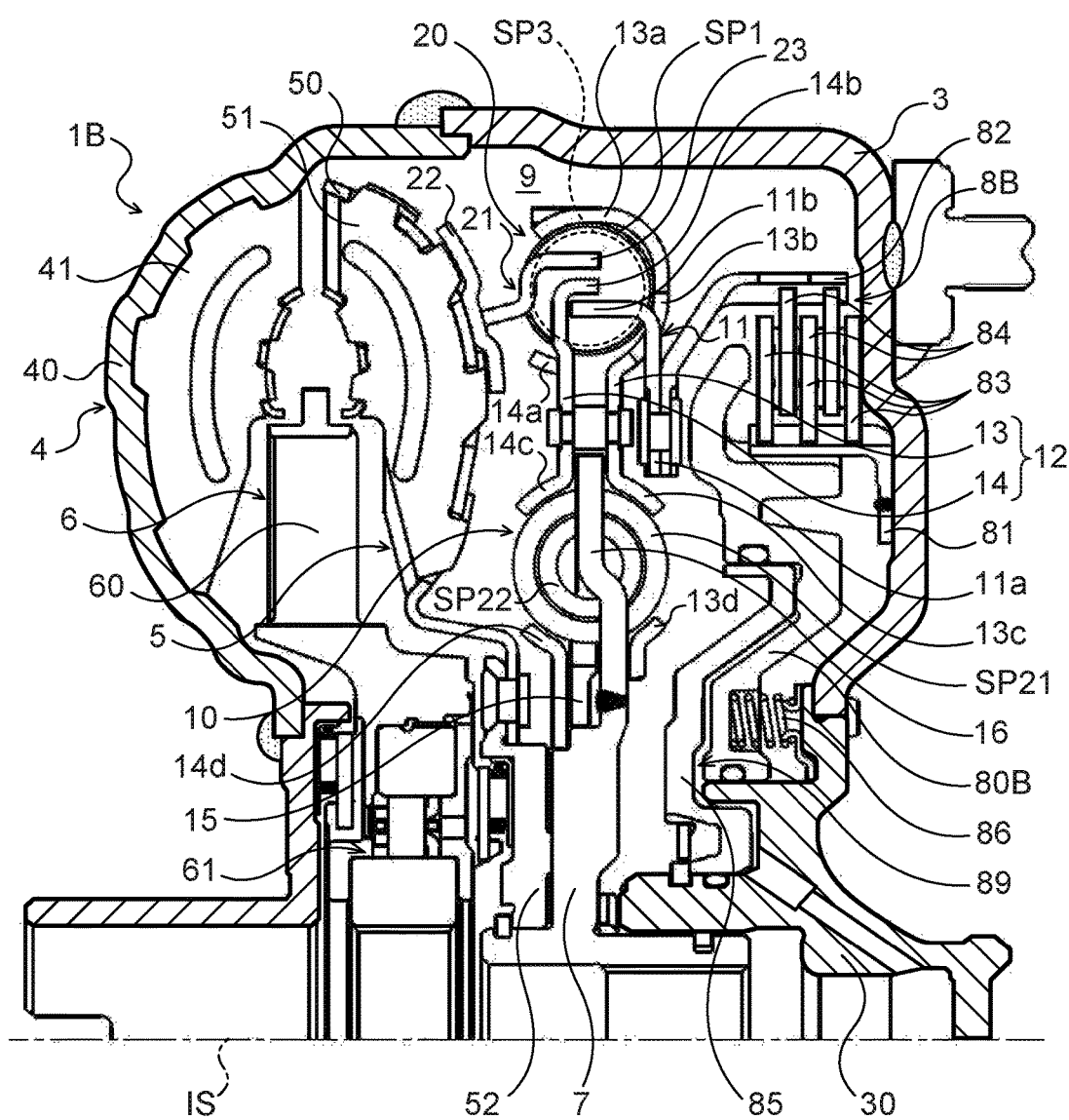
FIG. 5 is a partial sectional view showing a starting device according to a modified form.

FIG. 5 is a partial sectional view showing a starting device 1B according to a modified form. The starting device 1B shown in the figure corresponds to the above starting device 1 having the single-plate hydraulic lockup clutch 8 replaced with a multi-plate hydraulic lockup clutch 8B. The lockup clutch 8B includes a lockup piston 80B that is supported by a centerpiece 30 fixed to the front cover 3 such that the lockup piston 8B can move in the axial direction, an annular clutch hub 81 that is fixed to the inner surface of the front cover 3 so as to face the lockup piston 80B, a clutch drum 82, a plurality of first friction engagement plates 83 (separator plates) that are fitted on splines formed in the outer periphery of the clutch hub 81, and a plurality of second friction engagement plates (friction plates having a friction material on both surfaces thereof) 84 that are fitted in splines formed in the inner periphery of the clutch drum 82. The lockup clutch 8B further includes an annular flange member (oil chamber defining member) 85 that is attached to the centerpiece 30 of the front cover 3 so as to be located on the opposite side from the front cover 3 with reference to the lockup piston 80B, namely so as to be located closer to the damper hub 7 and the damper device 10 than the lockup piston 80B is, and a plurality of return springs 86 that are placed between the front cover 3 and the lockup piston 80B.

In the starting device 1B including such a multi-plate hydraulic lockup clutch 8B, the fixed portion 11a of the drive member 11 of the damper device 10 is coupled to or is formed integrally with the clutch drum 82. In the starting device 1B, hydraulic oil (lockup pressure) is supplied from the hydraulic control device, not shown, to the lockup chamber (engagement oil camber) 89 that is defined by the lockup piston 80B and the flange member 85. The lockup piston 80B can thus be moved in the axial direction so as to press the first and second friction engagement plates 83, 84 toward the front cover 3, whereby the lockup clutch 8B can be engaged (fully engaged or slip-engaged). The starting device 1B can also provide the functions and effects provided by the damper device 10.

Figure 6:
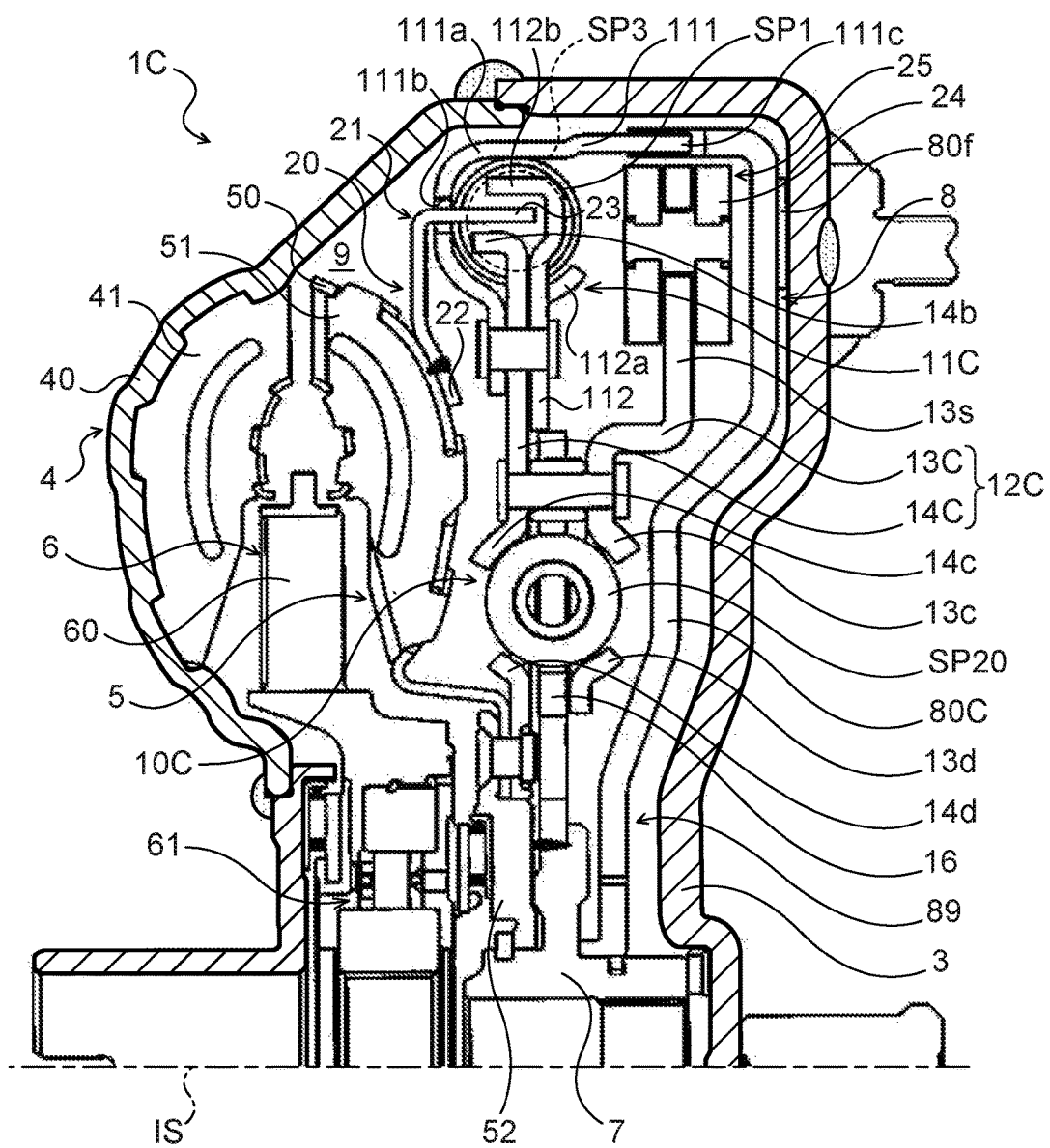
FIG. 6 is a partial sectional view showing a starting device including a damper device according to another modified form.

FIG. 6 is a partial sectional view showing a starting device 1C including a damper device 10C according to another modified form. A drive member 11C of the damper device 10C shown in the figure includes an annular first input member 111 having a spring surrounding portion (elastic body surrounding portion) 111a that surrounds the plurality of outer springs SP1 from the turbine runner 5 side to guide the plurality of outer springs SP1, and an annular second input member 112 that is coupled to the first input member 111 via a plurality of rivets. The first input member 111 has a plurality of openings 111b formed at regular intervals so as to respectively extend through a sidewall portion on the turbine runner 5 side of the spring surrounding portion 111a. The first input member 111 further has a concavo-convex engagement portion 111c that is fitted in a concavo-convex engagement portion formed in the outer periphery of a lockup piston 80C of the lockup clutch 8. The concavo-convex engagement portion 111c of the first input member 111 is fitted in the concavo-convex engagement portion of the lockup piston 80C to couple (couple by fitting) the drive member 11C and the lockup piston 80C such that the drive member 11C and the lockup piston 80C can rotate together.

The second input member 112 has a plurality of spring guide portions (spring support portions) 112a each formed inside the spring surrounding portion 111a of the first input member 111 to guide a corresponding one of the outer springs SP1, and a plurality of spring contact portions (input-side contact portions) 112b extending in the axial direction toward the pump impeller 4 and the turbine runner 5. In the damper device 10C of FIG. 6, the second input member 112 is aligned by and is rotatably supported by the outer peripheral surface of the driven member 16.

Moreover, in the damper device 10C, arc springs are used as a plurality of inner springs SP20, and the second intermediate member 15 of the damper device 10 is therefore omitted. This can further reduce rigidity (reduce the spring constant) of the inner springs SP20 and can reduce rigidity (increase the stroke) of the damper device 10C. Each of a first plate member 13C and a second plate member 14C of an intermediate member (intermediate element) 12C of the damper device 10C has spring contact portions (not shown) each contacting an end of a corresponding one of the inner springs SP20, and the driven member 16 has spring contact portions (not shown) each contacting an end of a corresponding one of the inner springs SP20.

In the damper device 10C, the second plate member 14C of the intermediate member (intermediate element) 12C is disposed between the first input member 111 and the second input member 112 such that the spring contact portions (intermediate-side contact portions) 14b can contact the ends of the outer springs SP1 and the ends of the third springs SP3 in the spring surrounding portion 111a of the first input member 111. The spring contact portions 23 of the coupling member 21 of the dynamic damper 20 protrude inside the spring surrounding portion 111a through openings 111b formed in the first input member 111, and each spring contact portion 23 contacts an end of a corresponding one of the third springs SP3 at a position radially outward of the spring contact portion 14b of the second plate member 14C. Moreover, each spring contact portion 112b of the second input member 112 (the drive member 11C) contacts an end of a corresponding one of the outer springs SP1 at a position radially outward of the spring contact portion 23 of the coupling member 21. That is, the distance between the axis of the damper device 10C and the spring contact portion (intermediate-side contact portion) 14b, the distance between the axis of the damper device 10C and the spring contact portion (elastic body contact portion) 23, and the distance between the axis of the damper device 10C and the spring contact portion (input-side contact portion) 112b are different from each other.

The spring contact portion 14b of the intermediate member 12C, the spring contact portion 23 of the coupling member 21, and the spring contact portion 112b of the drive member 11C are thus placed from the inside toward the outside in this order. The drive member 11, the first intermediate member 12, and the coupling member 21 therefore do not interfere with each other when rotating, and sufficiently long strokes of the outer springs SP1 and the third springs SP3 can be ensured. The spring contact portion 14b, the spring contact portion 23, and the spring contact portion 112b need not necessarily be placed from the inside toward the outside in this order so as to be separated from each other in the radial direction. Depending on the strokes required for the outer springs SP1 and the third springs SP3, two of the spring contact portion 14b, the spring contact portion 23, and the spring contact portion 112b may be placed radially outward or radially inward of the remaining one spring contact portion. That is, any one of the distance between the axis of the damper device 10C and the spring contact portion (intermediate-side contact portion) 14b, the distance between the axis of the damper device 10C and the spring contact portion (elastic body contact portion) 23, and the distance between the axis of the damper device 10C and the spring contact portion (input-side contact portion) 112b may be different from the remaining two distances.

In the starting device 1C of FIG. 6, the first plate member 13C of the intermediate member 12C of the damper device 10C has a mass body support portion 13s that is extended from a joint portion of the first plate member 13C with the second plate member 14C toward the front cover 3 and radially outward so as to be located next to the outer springs SP1 in the axial direction. The mass body support portion 13s of the first plate member 13C swingably supports a plurality of pendulum mass bodies 24 such that the plurality of pendulum mass bodies 24 are located next to each other in the circumferential direction. A centrifugal pendulum vibration absorbing device 25 is thus formed by the first plate member 13C as a support member and the plurality of pendulum mass bodies 24. As shown in FIG. 6, the centrifugal pendulum vibration absorbing device 25 is placed in the hydraulic transmission chamber 9 so as to be located between the lockup piston 80C and the damper device 10C, and is surrounded from the front cover 3 side (the engine side) and from the outside in the radial direction by the lockup piston 80C and the first input member 111 of the drive member 11C. Each pendulum mass body 24 is located next to each outer spring SP1 of the damper device 10 in the axial direction.

In the centrifugal pendulum vibration absorbing device 25, each pendulum mass body 24 is formed by a support shaft (roller) that is rollably inserted through a corresponding one of a plurality of guide holes formed at predetermined intervals in the mass body support portion 13s, which are, e.g., elongated holes having a substantially arc shape, and two metal plates (weights) that are fixed to both ends of the support shaft. The configuration of the centrifugal pendulum vibration absorbing device 25 is not limited to this. The centrifugal pendulum vibration absorbing device 25 may be configured so as to rotate together with the drive member 11C (input element) of the damper device 10C and the driven member (output element) 16.

The damper device 10C of the starting device 1C configured as described above can also provide functions and effects similar to those of the above damper device 10. In the centrifugal pendulum vibration absorbing device 25 coupled to the damper device 10C, the plurality of pendulum mass bodies 24 swing in the same direction with respect to the first plate member 13C (the intermediate member 12C) as a support member that supports each pendulum mass body 24, according to rotation of the first plate member 13C. The centrifugal pendulum vibration absorbing device 25 thus applies to the intermediate member 12C of the damper device 10 vibration having a phase in the opposite direction to vibration of the intermediate member 12C. In the starting device 1C, vibration of the intermediate member (intermediate element) 12C that tends to vibrate between the outer springs SP1 and the inner springs SP20 can thus be absorbed (dampened) by the centrifugal pendulum vibration absorbing device 25 and the overall vibration level of the damper device 10 can be reduced when the lockup operation is being performed by the lockup clutch 8.

Figure 7:
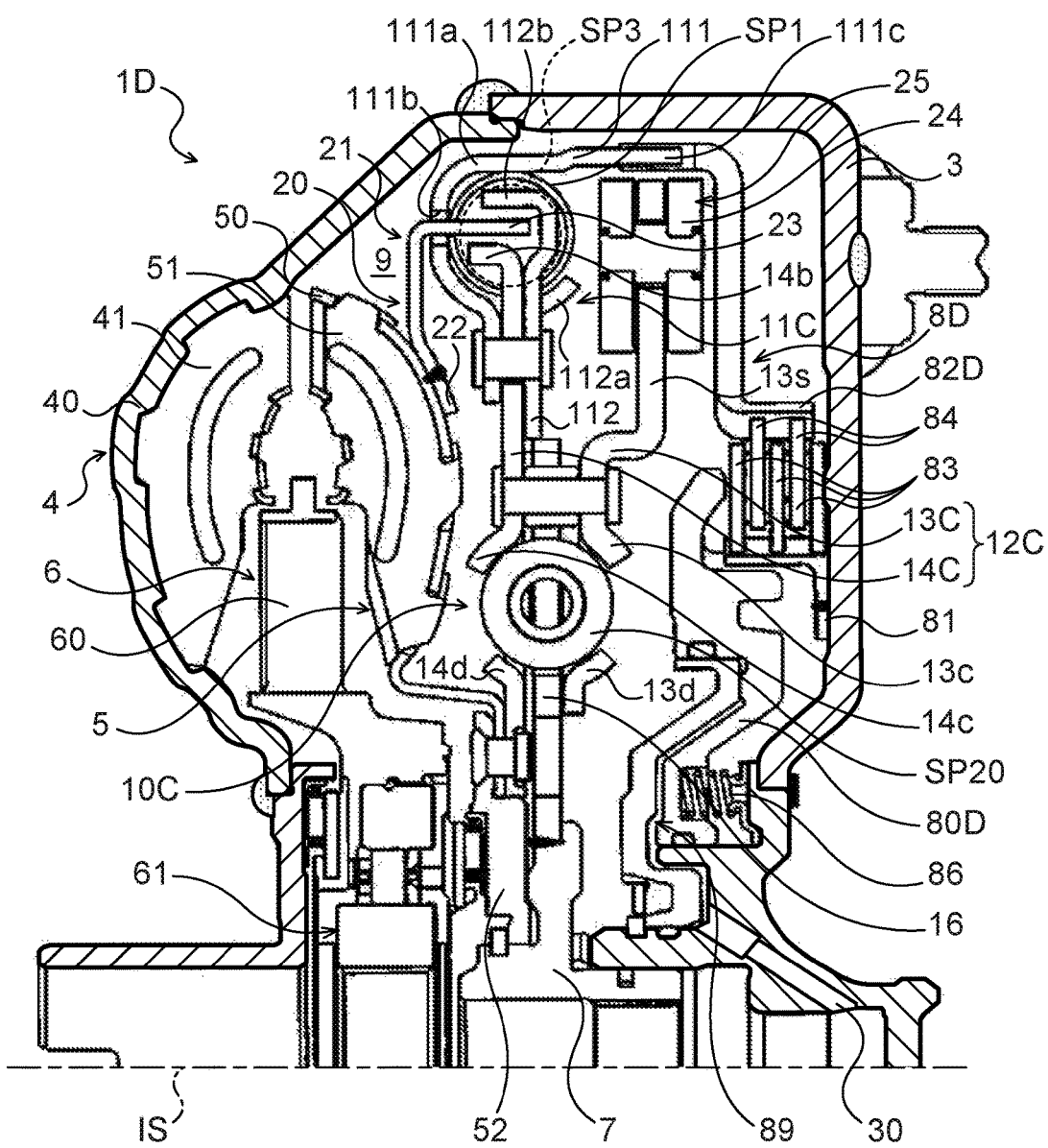
FIG. 7 is a partial sectional view showing a starting device according to a further modified form.

FIG. 7 is a schematic configuration diagram showing a starting device 1D according to a further modified form. The starting device 1D shown in the figure corresponds to the above starting device 1C having the single-plate hydraulic lockup clutch 8 replaced with a multi-plate hydraulic lockup clutch 8D configured similarly to the lockup clutch 8B shown in FIG. 5. In the starting device 1D, the concavo-convex engagement portion 111c formed in the first input member 111 of the damper device 10C is fitted in a concavo-convex engagement portion formed in the outer periphery of a clutch drum 82D of the lockup clutch 8D, whereby the drive member 11C is coupled (coupled by fitting) to the clutch drum 82D so that the drive member 11C and the clutch drum 82D can rotate together. The starting device 1D thus configured can also provide the functions and effects that are provided by the above damper device 10C.

In the above damper devices 10, 10C, the outer springs SP and the first and second inner springs SP21, SP22 or the inner springs SP20 operate in series via the first and second intermediate members 12, 15 or the intermediate member 12C. However, the damper devices 10, 10C may be configured such that the outer springs SP and the first and second inner springs SP21, SP22 or the inner springs SP20 operate in parallel. That is, the damper devices 10, 10C may be configured either as series damper devices having a drive member, an intermediate member, and a driven member as rotary elements or as parallel damper devices having a drive member, an intermediate member, and a driven member as rotary elements. In the starting devices 1, 1B, 1C, and 1D, the mass body of the dynamic damper 20 is formed by the turbine runner 5 and the coupling member 21. However, the dynamic damper 20 may have a dedicated mass body that is different from the turbine runner 5.

It should be understood that the present disclosure is not limited in any way to the above embodiments, and various modifications can be made. The above modes for carrying out the disclosure are merely shown as specific forms and are not intended to be limiting.

INDUSTRIAL APPLICABILITY

The present disclosure is applicable, for example, to manufacturing fields of damper devices and starting devices including the same, etc.

The invention claimed is:

1. A damper device including rotary elements comprising an input element and an output element, the damper device also includes an outer elastic body that transmits torque between the input element and the output element, and an inner elastic body that is disposed inward of the outer elastic body and that transmits torque between the input element and the output element, comprising:
    a dynamic damper that has a third elastic body coupled to any one of the rotary elements forming the damper device and a mass body coupled to the third elastic body, and that applies vibration of an opposite phase to the one of the rotary elements to dampen vibration, wherein
    the third elastic body is disposed so as to be located next to the outer elastic body in a circumferential direction, and
    the dynamic damper is outside a path transmitting the torque between the input element and the output element, wherein
    the inner elastic body includes a first inner elastic body and a second inner elastic body that are disposed so as to adjoin each other,
    the damper device further comprises: a first intermediate element that transmits power from the outer elastic body to the first inner elastic body; and a second intermediate element that transmits power from the first inner elastic body to the second inner elastic body, and
    the third elastic body is coupled to the first intermediate element.

2. The damper device according to claim 1, wherein a distance between an axis of the damper device and an axis of the outer elastic body is equal to a distance between the axis of the damper device and an axis of the third elastic body.

3. The damper device according to claim 2, wherein the axis of the outer elastic body and the axis of the third elastic body are included in a same plane orthogonal to the axis of the damper device.

4. The damper device according to claim 3,
wherein
the input element has an input-side contact portion that contacts the outer elastic body.
5. The damper device according to claim 1,
wherein
the first intermediate element has a plurality of intermediate-side contact portions that can contact the outer elastic body and the third elastic body,
the outer elastic body is supported from both sides by two of the intermediate-side contact portions in a mounted state of the damper device, and
both ends of the third elastic body respectively contact the intermediate-side contact portions in the mounted state of the damper device.
6. The damper device according to claim 5, wherein
the input element has a plurality of input-side contact portions that contact the outer elastic body, and
the outer elastic body is supported from both sides by two of the input-side contact portions in the mounted state of the damper device.
7. The damper device according to claim 1,
wherein
the input element has an input-side contact portion that contacts the outer elastic body,
the first intermediate element has an intermediate-side contact portion that can contact the outer elastic body and the third elastic body,
a coupling member having a plurality of elastic body contact portions provided so as to contact both ends of the third elastic body is fixed to the mass body of the dynamic damper, and
at least one of a distance between the axis of the damper device and the input-side contact portion, a distance between the axis of the damper device and the intermediate-side contact portion, and a distance between the axis of the damper device and the elastic body contact portion is different from the remaining two distances.
8. The damper device according to claim 7, wherein
the input-side contact portion of the input element is located next to the intermediate-side contact portion of the first intermediate element in a radial direction of the damper device, and
the intermediate-side contact portion of the first intermediate element is located next to the elastic body contact portion of the coupling member in the radial direction of the damper device.
9. The damper device according to claim 8, wherein
the distance between the axis of the damper device and the elastic body contact portion is larger than the distance between the axis of the damper device and the intermediate-side contact portion.
10. The damper device according to claim 9, wherein
the distance between the axis of the damper device and the input-side contact portion, the distance between the axis of the damper device and the intermediate-side contact portion, and the distance between the axis of the damper device and the elastic body contact portion are different from each other.
11. The damper device according to claim 10, wherein
the first intermediate element includes a first plate member having an annular guide portion that guides the outer elastic body, and a second plate member having the intermediate-side contact portion and coupled to the first plate member,
the input-side contact portion of the input element protrudes inside the annular guide portion through an opening formed in the first plate member, and contacts the outer elastic body at a position radially inward of the intermediate-side contact portion of the second plate member, and
the elastic body contact portion of the coupling member contact an end of the third elastic body at a position radially outward of the intermediate-side contact portion.
12. The damper device according to claim 10, wherein
the input element includes a first input member having an elastic body surrounding portion that surrounds and guides the outer elastic body, and a second input member having the input-side contact portion and coupled to the first input member,
the elastic body contact portion of the coupling member protrudes inside the elastic body surrounding portion through an opening formed in the first input member, and contacts an end of the third elastic body at a position radially inward of the input-side contact portion of the second input member, and
the first intermediate element is disposed between the first input member and the second input member such that the intermediate-side contact portion can contact the outer elastic body and the third elastic body at a position radially inward of the elastic body contact portion of the coupling member.
13. The damper device according to claim 11, wherein
the outer elastic body is an arc coil spring having an arcuate shape when not under load, and the inner elastic body is a linear coil spring having a linear shape when not under load.
14. The damper device according to claim 13, wherein
the third elastic body is a linear coil spring having a linear shape when not under load.
15. The damper device according to claim 14, wherein
$0.90 \times f \leq fdd \leq 1.10 \times f$ is satisfied, where "f" represents a resonance frequency of the damper device, and "fdd" represents a resonance frequency of the dynamic damper.
16. The damper device according to claim 15, further comprising:
a centrifugal pendulum vibration absorbing device coupled to any one of the rotary elements included in the damper device.
17. The damper device according to claim 16, wherein
$1.0 \leq Los/Lds \leq 10.0$ is satisfied, where "Los" represents a circumferential length of the outer elastic body in the mounted state of the damper device, and "Lds" represents a circumferential length of the third elastic body in the mounted state of the damper device.
18. A starting device including the damper device according to claim 1, further comprising a pump impeller, and a turbine runner that together with the pump impeller forms a hydraulic transmission device, wherein
the dynamic damper has a coupling member that has a plurality of elastic body contact portions provided so as to contact both ends of the third elastic body, and that is fixed to the turbine runner, and
the mass body of the dynamic damper is formed at least by the turbine runner and the coupling member.
19. A starting device including the damper device according to claim 1, further comprising a pump impeller, and a turbine runner that together with the pump impeller forms a hydraulic transmission device, wherein the dynamic damper has a dedicated mass body that is different form the turbine runner.

20. The damper device according to claim 1, wherein the axis of the outer elastic body and the axis of the third elastic body are included in a same plane orthogonal to the axis of the damper device.

21. The damper device according to claim 1, wherein
the input element has an input-side contact portion that contacts the outer elastic body, and the third elastic body is coupled to the first intermediate element.

22. The damper device according to claim 1, wherein
the first intermediate element has a plurality of intermediate-side contact portions that can contact the outer elastic body and the third elastic body,
the outer elastic body is supported from both sides by two of the intermediate-side contact portions in a mounted state of the damper device, and
both ends of the third elastic body respectively contact the intermediate-side contact portions in the mounted state of the damper device.

23. The damper device according to claim 1, wherein
the input element has an input-side contact portion that contacts the outer elastic body,
the first intermediate element has an intermediate-side contact portion that can contact the outer elastic body and the third elastic body,
a coupling member having a plurality of elastic body contact portions provided so as to contact both ends of the third elastic body is fixed to the mass body of the dynamic damper, and
at least one of a distance between the axis of the damper device and the input-side contact portion, a distance between the axis of the damper device and the intermediate-side contact portion, and a distance between the axis of the damper device and the elastic body contact portion is different from the remaining two distances.

24. The damper device according to claim 1, wherein the outer elastic body is an arc coil spring having an arcuate shape when not under load, and the inner elastic body is a linear coil spring having a linear shape when not under load.

25. The damper device according to claim 1, wherein the third elastic body is a linear coil spring having a linear shape when not under load.

26. The damper device according to claim 1, wherein $0.90 \times f \leq fdd \leq 1.10 \times f$ is satisfied, where "f" represents a resonance frequency of the damper device, and "fdd" represents a resonance frequency of the dynamic damper.

27. The damper device according to claim 1, further comprising:
a centrifugal pendulum vibration absorbing device coupled to any one of the rotary elements included in the damper device.

28. The damper device according to claim 1, wherein $1.0 \leq Los/Lds \leq 10.0$ is satisfied, where "Los" represents a circumferential length of the outer elastic body in the mounted state of the damper device, and "Lds" represents a circumferential length of the third elastic body in the mounted state of the damper device.

29. The damper device according to claim 7, wherein the distance between the axis of the damper device and the elastic body contact portion is larger than the distance between the axis of the damper device and the intermediate-side contact portion.

30. The damper device according to claim 7, wherein the distance between the axis of the damper device and the input-side contact portion, the distance between the axis of the damper device and the intermediate-side contact portion, and the distance between the axis of the damper device and the elastic body contact portion are different from each other.

31. The damper device according to claim 7, wherein the first intermediate element includes a first plate member having an annular guide portion that guides the outer elastic body, and a second plate member having the intermediate-side contact portion and coupled to the first plate member,
the input-side contact portion of the input element protrudes inside the annular guide portion through an opening formed in the first plate member, and contacts the outer elastic body at a position radially inward of the intermediate-side contact portion of the second plate member, and
the elastic body contact portion of the coupling member contact an end of the third elastic body at a position radially outward of the intermediate-side contact portion.

32. The damper device according to claim 7, wherein the input element includes a first input member having an elastic body surrounding portion that surrounds and guides the outer elastic body, and a second input member having the input-side contact portion and coupled to the first input member,
the elastic body contact portion of the coupling member protrudes inside the elastic body surrounding portion through an opening formed in the first input member, and contacts an end of the third elastic body at a position radially inward of the input-side contact portion of the second input member, and
the first intermediate element is disposed between the first input member and the second input member such that the intermediate-side contact portion can contact the outer elastic body and the third elastic body at a position radially inward of the elastic body contact portion of the coupling member.

* * * * *